United States Patent [19]
Krol et al.

[11] Patent Number: 5,838,868
[45] Date of Patent: Nov. 17, 1998

[54] SEMICONDUCTOR FIBER LIGHT AMPLIFIER

[75] Inventors: Mark F. Krol, New Hartford; Philipp Kornreich, North Syracuse; John L. Stacy, Sauquoit; Raymond K. Boncek, Fayetteville, all of N.Y.

[73] Assignee: Syracuse University, Syracuse, N.Y.

[21] Appl. No.: 497,361

[22] Filed: Jun. 30, 1995

[51] Int. Cl.$^6$ ..................................... G02B 6/22
[52] U.S. Cl. ..................... 385/127; 385/144; 428/542.8
[58] Field of Search ................... 385/123–127, 385/141, 142, 144; 428/542.8

[56] References Cited

U.S. PATENT DOCUMENTS

| | | | |
|---|---|---|---|
| 3,121,203 | 2/1964 | Heywang | 332/164 |
| 3,465,159 | 9/1969 | Stern | 250/214 LA |
| 3,949,315 | 4/1976 | Zeidler | 359/341 |
| 5,058,976 | 10/1991 | DiGiovanni et al. | 359/173 |
| 5,067,789 | 11/1991 | Hall et al. | 385/27 |
| 5,121,460 | 6/1992 | Tumminelli et al. | 385/126 |
| 5,278,850 | 1/1994 | Ainslie et al. | 372/6 |
| 5,291,501 | 3/1994 | Hanna | 372/6 |
| 5,338,607 | 8/1994 | Kawamoto et al. | 428/373 |
| 5,373,576 | 12/1994 | Minns et al. | 385/125 |
| 5,381,262 | 1/1995 | Arima et al. | 359/341 |
| 5,502,787 | 3/1996 | Capasso et al. | 385/123 |

OTHER PUBLICATIONS

Digonnet, Michel J.F., *Rare Earth Doped Fiber Lasers and Amplifiers,* Marcel Dekker, Inc. 1993, pp. 1–18, [No Month].

*Primary Examiner*—John D. Lee
*Attorney, Agent, or Firm*—Wall Marjama Bilinski & Burr

[57] ABSTRACT

A glass fiber suitable for use in a light amplifier or laser application which includes an inner cylindrical glass core with a substantially uniform layer of a direct band gap semiconductor material surrounding said core, and a substantially uniform layer of an outer glass cladding surrounding said semiconductor layer. The preform from which the fiber is made is also disclosed.

20 Claims, 6 Drawing Sheets

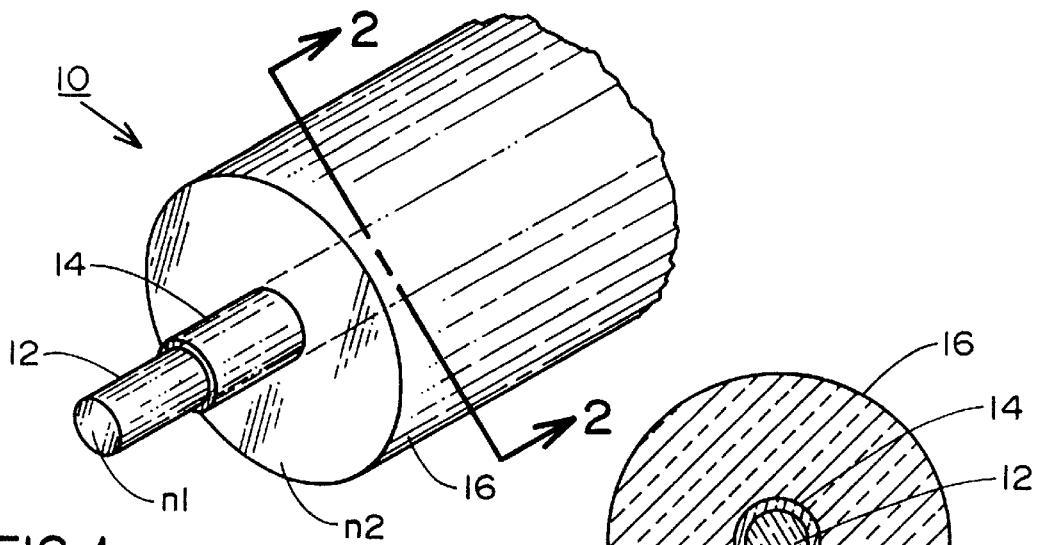
FIG. 1
FIG. 2
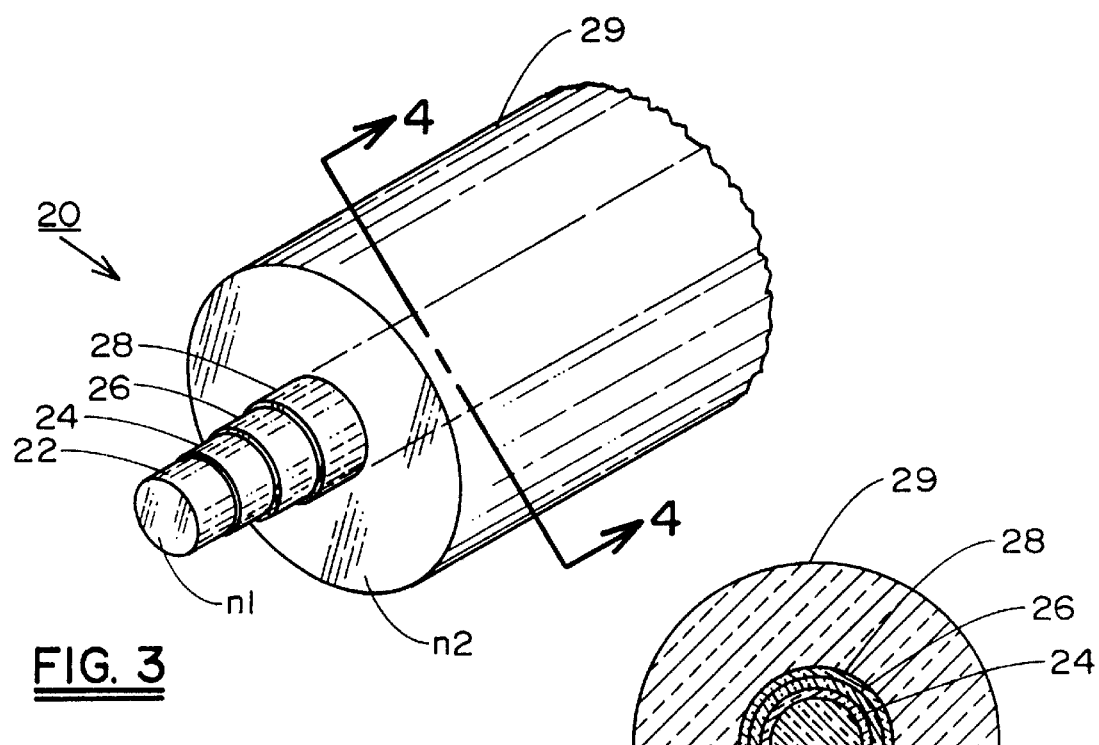
FIG. 3
FIG. 4

SEMICONDUCTOR FIBER LIGHT AMPLIFIER

BACKGROUND OF THE INVENTION

The present invention relates to the amplification of optical signals and more specifically to a semiconductor fiber suitable for use as a light amplifier (SCFLA).

The purpose of the present invention is to supply a device which provides amplification of optical signals. These optical signals are typically found in wave guided media such as fiber optic cable. Since the device itself is a short piece of fiber optic cable it can be coupled directly to the media with very little coupling loss and no interruption of the transmitted signal. The device of the present invention will amplify signals in the 0.5 to 12 micrometer ($\mu$m) wavelength band depending upon the semiconductor material used.

In the prior art, the amplification of lightwave signals has been difficult since photons which make up the lightwave signals are not charged particles and therefore difficult to control. Attempting to amplify optical signals without first removing them from the transmission path has been a major stumbling block in the field because it adds intolerable delays in the transmission of the signal of interest. The development of Erbium doped fiber light amplifiers (EDFLAs) made it possible to amplify optical signals at 1.55 micrometers. U.S. Pat. No. 5,058,976 illustrates a typical optical fiber system of the prior art which incorporates Erbium doped fibers. The semiconductor fiber light amplifier (SCFLA) of the present invention has the capability to amplify optical signals in the 0.5 to 12 micrometer region which covers the wavelength band of interest for all lightwave communications.

The semiconductor fiber light amplifier (SCFLA) is a piece of fiber optic cable. A typical, but not exclusive, profile is shown in FIG. 1 of the drawings which will be described in greater detail hereinafter. The electrons from the conduction band of the semiconductor material will spontaneously recombine with holes in the valence band giving off photons. This process alone will not produce the necessary amplification. However, as in most lasers, electrons from the conduction band will at a substantially faster rate recombine with holes in the valence band when light is propagating through the fiber. This induced recombination of electrons and holes generates light that is in phase with the incoming light. The stimulated light and the incoming light amplitudes add since they are in phase semiconductor and thus provides the required amplification.

The fibers of the present invention are the key components for a new type of fiber light amplifier. Because these fibers only require millimeter lengths to provide proper amplification, instead of meters as required by the fibers of the prior art, this will also find application in integrated optical circuits.

The Semiconductor Fiber Light Amplifier (SCFLA) of the present invention has several advantages over the existing prior art rare earth doped fiber light amplifiers. The SCFLAs have substantially more electron states per unit length than rare earth doped fiber amplifiers. This permits them to be 3 to 20 mm long whereas rare earth dopes FLAs are typically 5 to 20 meters long to achieve the needed amplification. Because of the short length of the fibers of the present invention, it's easier and cheaper to develop them into a device. It also makes it useful for making integrated devices requiring amplification. Another distinct advantage of semiconductor FLAs is that they have a large range of continuous energy at which the device can be optically pumped, thus making this device broad band and easier to obtain pump lasers. These devices, depending upon the material used and material thickness, can function either at 1.3 and 1.55 micrometers, a key wavelength for communications.

SUMMARY OF THE INVENTION

The present invention is directed to a composite multi-layer semi-conductor cylinder fiber light amplifier, and the preform from which it is manufactured. In one embodiment, the structure of the device comprises an inner glass core which is surrounded by one or more thin layers of semi-conductor material. The semi-conductor is of the direct gap type (Also referred to as direct energy gap) such as CdS, CdTe, GaAs, and the like. The semi-conductor coated core is surrounded by an outer glass cladding.

The fibers of the present invention are typically made from a larger preform, which in one embodiment is fabricated by first vacuum depositing a thin-film of a direct band-gap semiconductor such as CdS or CdTe on a rotating glass rod to form the desired thickness of the semi-conductor layer. The semi-conductor coated glass rod is then inserted into a hollow glass tube which is closed at one end. The structure is then evacuated and collapsed through conventional techniques resulting in a integral composite preform comprising an inner glass core surrounded by a thin semi-conductor layer encased in an outer glass cladding. A typical preform suitable for use in the present invention has a diameter of approximately 10–35 mm and a length of approximately 100 mm to 1.5 m. The diameter of the preform may be as small as 2 mm. A fiber is then pulled from the resulting preform using conventional fiber pulling techniques and hardware well known to the art.

Typical fibers which have been fabricated and tested according to the present invention include a Pyrex glass core approximately 70 $\mu$m in diameter, and an outer glass cladding 140 $\mu$m in diameter. Typical commercial single mode fibers have an outer diameter of about 125 $\mu$m, and a glass core of about 8 $\mu$m in diameter. The semi-conductor layer is typically about 30–300 Å thick. In an optional embodiment, a plurality of semiconductor layers are used. Typically, a layer of a given material such as CdS is sandwiched or buffered on each side by a layer of a different semiconductor material. The multi-layer semiconductor cylindrical fiber light amplifiers made using the devices of the present invention can operate at a range of wavelengths of 0.5 to 12 micrometers, depending upon material used and film thickness, and exhibit a gain of about 20 to 40 dB per cm. The main application of these devices is for use as light amplifiers in optical signal distributing and switching networks, and as repeaters in fiber optic communication links. Further applications include use in optical test equipment.

BRIEF DESCRIPTION OF THE DRAWING

FIG. 1 is a perspective view of one embodiment of a device of the present invention.

FIG. 2 is a sectional view of the device of FIG. 1 taken along line 2—2.

FIG. 3 is a perspective view of a second embodiment of a device of the present invention.

FIG. 4 is a sectional view of the device of FIG. 3 taken along line 3—3.

DETAILED DESCRIPTION OF THE INVENTION

Figure 5:
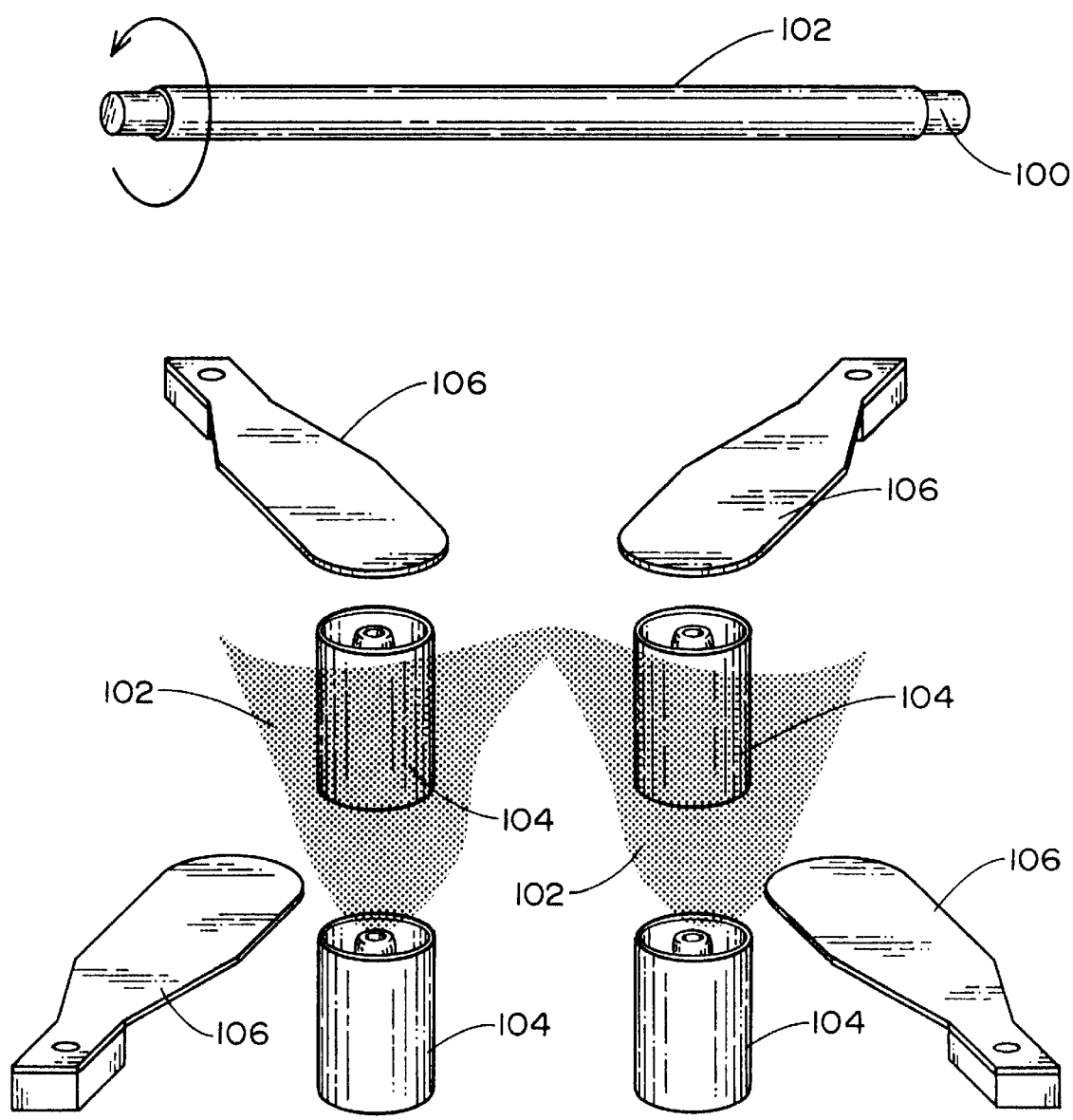
FIG. 5 is a schematic view of a vacuum deposition profile suitable for use in making a device of the present invention.

Referring more specifically to the drawings, and in particular FIGS. 1–4, are shown two perspective views of two embodiments of the present invention. FIG. 1 illustrates a preform 10 of the present invention which comprises an inner glass core 12 which is surrounded by semiconductor layer 14. The semiconductor layer is in turn surrounded by an outer glass cadding 16. The refractive index n1 and n2, respectively, for the core and glass cadding are slightly different with the outer glass cadding always having a slightly lower index of refraction then the glass core. The glass core and cladding are usually made of the same glass, and may comprise any suitable glass which is used for making optical fibers such as Pyrex, pure fused silica, aluminosilicate glasses, etc.

The semiconductor material which makes up layer 14 must comprise a direct gap semiconductor. Any suitable direct gap semiconductor material may be used in the present invention. Typical materials include CdS, CdTe, CdSSe, GaAs, GaSb, InP, InAs, InSb, InGaAs, InAlGaAs, PbS, PbCdS, PbSiS, HgCdTe, InGaAsP, AlInP, AlGaAs, AlInAs, AlGaSb, AlInSb, GaInP, GaInSb, GaAsP, GaAssb, InPAs, and InAsSb. FIG. 2 illustrates a cross section of FIG. 1 along lines 2—2 showing a schematic representation of the various layers of the device.

FIG. 3 illustrates an alternative embodiment of the device of FIG. 1 in which the preform 20 comprises an inner core 22 and concentric semiconductive layers 24, 26 and 28 and outer glass cladding 30. In this embodiment the two outer semiconductive layers 24 and 28 buffer and protect inner semiconductor layer 26 against undesirable effects or interference from the interface between the glass core and outer glass cladding. FIG. 4 is a cross sectional view of the FIG. 3 taken along lines 4—4 of FIG. 3 showing the relative geometry of the various layers.

Figure 10:
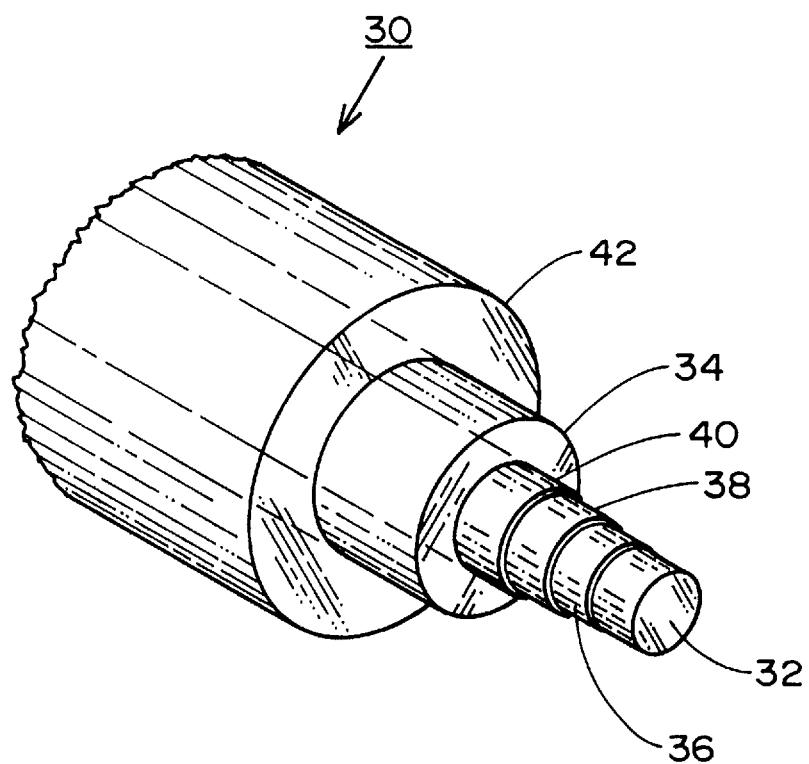
FIG. 10 is a perspective view of a third embodiment of the device of the present invention.

FIG. 10 illustrates a third embodiment of the present invention in which the preform 30 comprises an inner glass core 32, three semiconductor layers 30, 38 and 40, an outer core 34 made of the same glass as the inner core 32, and an outer glass cladding 42. Alternatively a single semiconductor surrounding the inner core layer can also be employed in this embodiment.

Figure 6:
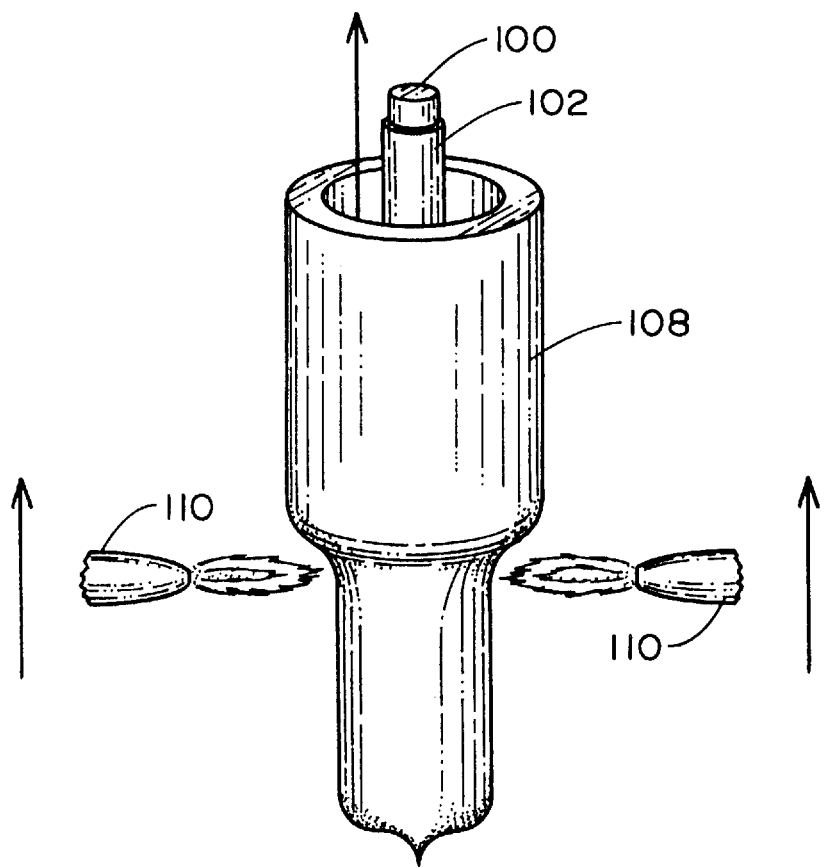
FIG. 6 is a schematic view illustrating the process for making the preform of the present invention.
Figure 7:
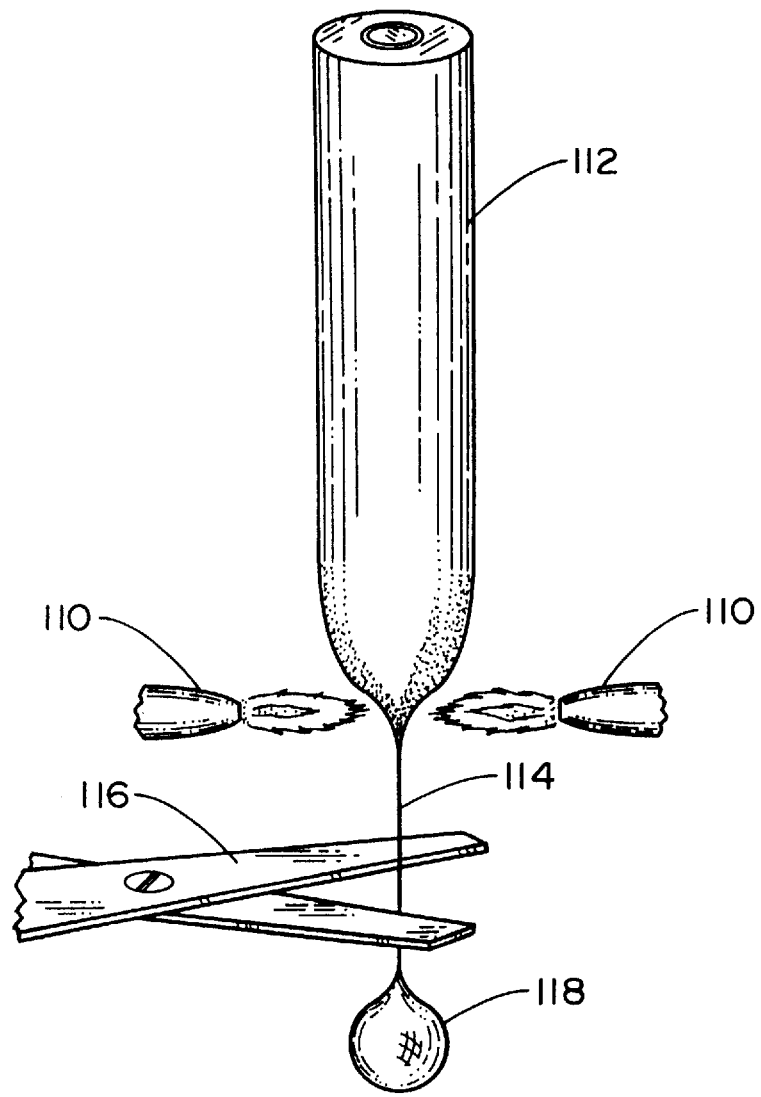
FIG. 7 is a schematic view illustrating the fiber pulling process.

FIGS. 5, 6 and 7 schematically illustrate the vapor deposition technique to form the semiconductive layer on the glass core, and the formation of the preform and the subsequent fiber pulling processes, respectively. Other techniques such as chemical vapor deposition (CVD) can also be used in making the devices of the present invention.

In FIG. 5 the apparatus illustrated schematically presents the key components which can be contained within any conventional vacuum chamber available in the art. The glass rod 100 is rotated at an appropriate speed contained above a series of vapor infusion cells 104 which contain the appropriate semiconductor material 102. Shutters 106 are positioned above each cell in order to control the deposition, technique and timing of the process.

FIG. 6 illustrates schematically the formation of the preform in which the semiconductor layer 102 coated on rod 100 formed in FIG. 5 is placed within a hollow cylindrical outer glass tube 108, and the tube collapsed using a plurality of burners 110 forming a preform of the type illustrated in FIGS. 1 and 2. The side arrow illustrates the movement direction of the bunners 110 and the top arrow indicates the direction of the vacuum within tube 108. The technique illustrated in FIG. 6 is well known in the art and is described in more detail in the Rare Earth Doped Fiber Lasers and Amplifiers book referred to herein. FIG. 7 schematically illustrates the preform, 112 such as that illustrated in FIGS. 1 and 2 and formed in FIG. 6, in which gas burners 110 are used to melt down the preform at a selected location and a glass fiber 114 pulled from the preform by any conventional technique well known to the art, and more fully described in the prior art referred to herein.

More specifically, the first step in the fabrication of a Semiconductor Cylinder Fiber Light Amplifier (SCFLA) is to fabricate a preform from which a fiber is later drawn. The first step in the SCFLA preform fabrication is to clean a glass rod which serves as the core. The glass rod is typically 1 to 3 mm in diameter and about 200 mm long. The glass rod is first washed with detergent and then rinsed in dilute HF acid, deionized water, and various solvents such as methyl alcohol etc.

The cleaned glass rod is loaded into a conventional vacuum chamber. The vacuum chamber contains effusion sources holding various components of semiconductor materials as well as a means for heating and rotating the glass rod during vacuum deposition. The effusion cells can hold either the semiconductor compounds or the component materials that form direct gap semiconductor compounds. The vacuum chamber also contains a liquid nitrogen shroud that aids in maintaining a high vacuum during deposition. The vacuum chamber is pumped out and flushed several times with a clean gas such as nitrogen to insure that the residual gas in the vacuum chamber has at least predictable properties. A suitable vacuum for the chamber is about $10^{-7}$ Torr. The glass rod which is rotated during deposition is brought to its proper speed, approximately 25 rpm is suitable. A glass rod heater, contained within the vacuum chamber, is brought to its proper temperature, and the effusion cells with shutters closed are also brought to their correct temperature for deposition. No deposition occurs at this point since the shutters are closed.

The shutters of the effusion cells are opened and the various semiconductor layers are deposited. The thickness of each semiconductor layer is monitored with a calibrated thickness monitor. The glass rod temperature, the various effusion cell temperatures and the film thickness information are fed into a computer. The computer, in turn controls the various temperatures and effusion cell shutters. Thus, the computer can be programmed to follow a prescribed deposition procedure. After all depositions have been finished and all the effusion cell shutters have been closed, both the glass rod and effusion cells are allowed to cool before the vacuum chamber is opened and the glass rod removed.

A glass tube, which will become the outer cladding, is closed manually at one end. In order to guide the light by total internal reflection, the glass tube (cladding) must have an index of refraction that is less than the index of refraction of the glass rod (core). This concept regarding the difference in the index of refraction is conventional and well understood for optical fibers employed in amplifiers, and is recognized and discussed in the book: *Theory of Dielectric Optical Waveguides*; Dietrich Marcuse; AT&T Bell Laboratories: Academic Press Inc. 1991, which is incorporated herein by reference. The glass rod containing the semiconductor layer is inserted into the open inside diameter of the glass tube and loaded into a conventional glass lathe. The glass tube is held securely by chucks at both ends. A vacuum line is attached to the open end of the glass tube. The glass rod is supported by two spacers to keep it centered in the glass tube. The glass tube is pumped out and flushed with a clean gas, such as nitrogen, several times to insure that the residual gas in the vacuum chamber has at least predictable properties. The tube is finally evacuated to about 10 mTorr. The tube is collapsed onto the semiconductor layer of the glass rod by running a burner along the length of the tube at a temperature sufficient to soften and collapse the outer tube. The outside air pressure aids in collapsing the tube since there is a vacuum inside the tube. During this process either the tube or the burner must rotate to yield a uniform preform. During the collapse, all layers maintain there cross sectional areas. That is, the glass tube in its original and collapsed form has the same cross sectional area.

The above described process produces a solid preform consisting of a glass core surrounded by one or more layers of semiconductor material which in turn is surrounded by a glass cladding. The core was formed by the glass rod and the cladding was formed by the collapsed glass tube. Additional tubes may be collapsed onto the first tube to form thicker claddings. The various layers in the preform have dimensions that are proportional to the dimensions of these layers in the final fiber. A glass handle may optionally be attached to one end of the preform to facilitate easier handling. This process completes the making of the preform.

The preform is next loaded into a conventional fiber drawing tower. In this type equipment the preform remains in place. The burner is positioned near the bottom of the preform and ignited. The bottom of the preform starts to soften and a glob of glass starts to drop pulling a fiber behind it. This glass blob is caught and cut from the fiber that was trailing behind it. This step is illustrated schematically in FIG. 7 where the blob of glass 118 pulls fiber 114 and is cut at location 116. The glass blob is disposed of as scrap. An operator then threads the fiber through a fiber thickness monitor, such as a plastic coater, and a slowly rotating capstan. The operator continuously draws fiber as it is threaded through the various devices. At this point, the capstan now draws the fiber. The capstan speed and burner temperature are adjusted until a desired fiber thickness is obtained. The fiber emerging from the capstan is dumped on the floor up to this point. When a desired fiber thickness is reached, the fiber on the floor is broken off and the fiber now emerging from the capstan is spooled onto a spool. The initial fiber on the floor is disposed of as scrap. The above process, which is illustrated in FIGS. 5–7, is well known in the art and does not constitute a part of the present invention.

It should be understood that the preform and resulting fiber of the present invention can be made by any other conventional methods which are available in the art such as chemical vapor deposition or liquid phase deposition. These processes are in part described in the book *Rare Earth Doped Fiber Lasers and Amplifiers*; edited by Michel J. F. Digonnet; published by Marcel Dekker Inc. 1993 which is incorporated herein by reference. (See in particular chapter 1, pages 1–18). U.S. Pat. Nos. 5,058,976; 5,373,576; 5,291, 501; 5,278,850; and 3,949,315 disclose suitable glasses, methods of preform and fiber manufacture, and use applications for the preform and fiber of the present invention, and are incorporated herein by reference.

The dimensions of all the layers in the fiber are proportional to the dimensions of the layers in the preform. That is the diameter of all cylinders in the preform are divided by the same factor to obtain the diameters of the cylinders in the fiber.

In operation, light in the core strikes the core cladding boundary and reflects back into the core, thus guiding the light along the fiber core.

Several fibers with approximately 50 Å thick CdTe and CdS semiconductor cylinders, respectively, were fabricated and tested using the method and apparatus described above. The CdTe and CdS are of 99.99% purity, in powder form, and available from Johnson Mathey, Boston, Mass. These fibers were fabricated from preforms having the configuration illustrated in FIGS. 1 and 2. These fibers had approximately 70 $\mu$m diameter Pyrex glass cores (Corning Brand No. 7740) and 140 $\mu$m diameter Pyrex glass claddings. The glass comprising the core and cladding have a slightly different index of refraction, with the cladding have the lower index of refraction.

Figure 8:
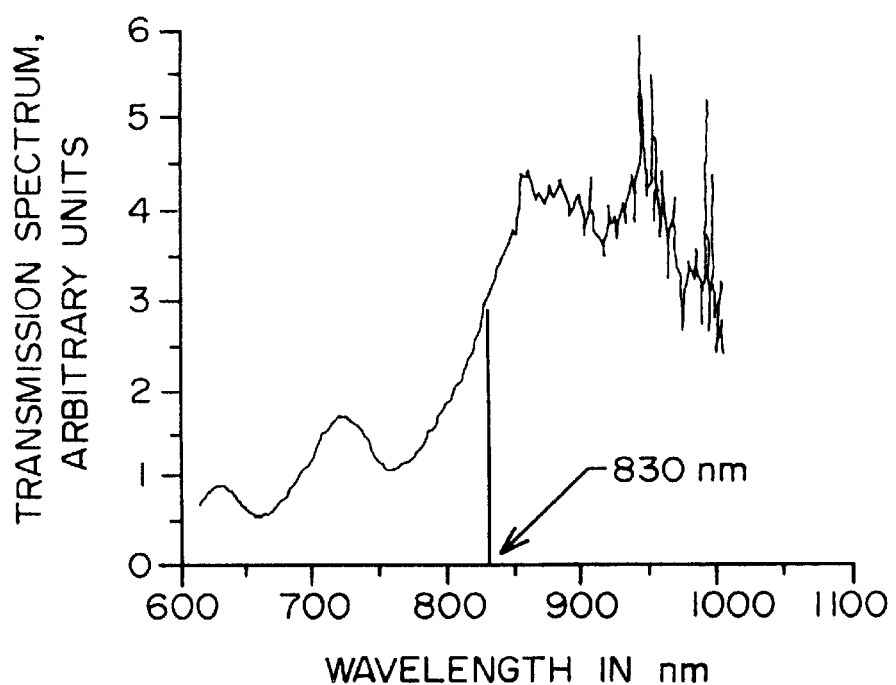
FIG. 8 illustrates the transmission spectrum and absorption edge for one embodiment of a fiber section made by the present invention.

The room temperature transmission spectrum of CdTe fiber sections about 20 mm in length and CdS fiber sections about 150 mm in length were measured. Samples were used from several fibers with identical results. Measurements with identical results were obtained using an Ando type AQ 1425 spectrum analyzer and a SPEX type 1708/04 computerized spectrometer. As shown in FIG. 8, the CdTe fibers exhibit an absorption edge at 830 nm. This corresponds to the absorption edge of bulk CdTe. The absorption spectrum of one of the CdTe preforms was also measured. The preform also exhibited an absorption edge at 830 nm. A small quantum size effect was predicted for the fibers. That is, it was expected the fibers would have an absorption edge at a wavelength somewhat shorter than the absorption edge wavelength of bulk CdTe in the preforms. This effect, however, was not observed. Although these effects are not fully understood, it is believed that surface states counteracted the quantum size effect. A model was constructed that had a quantum well potential representing the approximately 50 Å thick semiconductor film with deep, approximately 3 Å wide, potential wells on both sides of the semiconductor quantum well representing the surface states. Numeric energy level calculations showed that even moderate surface state potentials are quite capable of depressing the quantum size effect.

Figure 9:
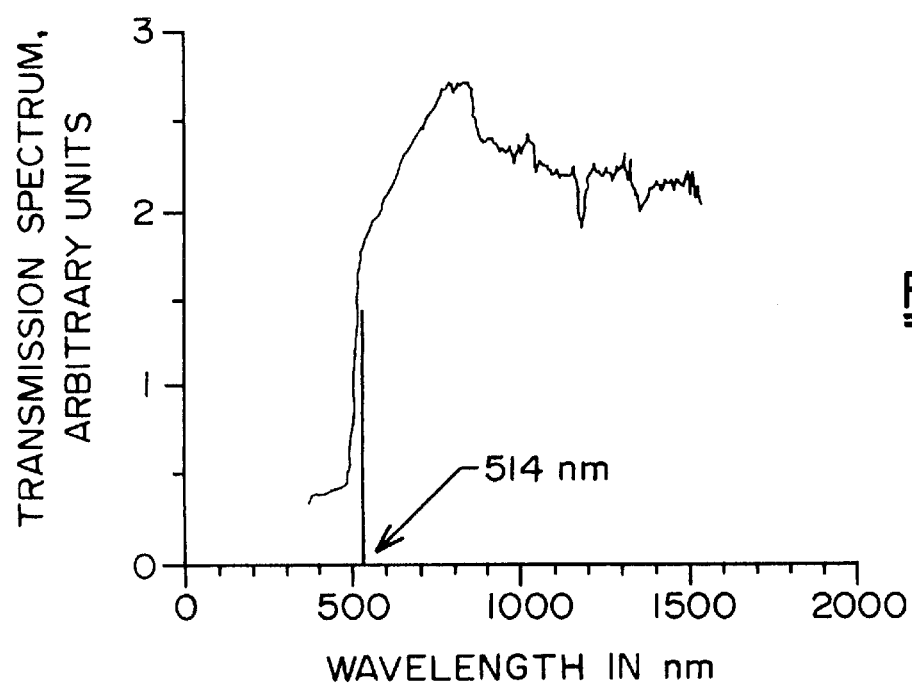
FIG. 9 illustrates the transmission spectrum and absorption edge for a second embodiment of a fiber section made by the present invention.

The CdS fibers exhibit a steep absorption edge at 514 nm, as shown in FIG. 9. This corresponds to the absorption edge of bulk CdS. The transmission spectrum of one of the CdS preforms was also measured. The preform also exhibited an absorption edge at 514 nm. Again, a small quantum size effect was predicted for the fibers. This was also not observed. All measurements were performed at room temperature.

Although the invention has described in or preferred embodiment illustrated by a cylindrical geometry, other configurations such as a strip or ribbon having an internal glass core and contiguous semiconductor encased in an outer glass cladding are also intended to be included within the scope of the present invention.

While there has been described what at present are considered to be the preferred embodiments of the present invention, it will be readily apparent to those skilled in the art that various changes and modifications may be made therein without departing from the invention, and it is intended in the appended claims to cover such changes and modifications as fall within the true spirit and scope of the invention.

What is claimed is:

1. A composite preform in the form of a cylindrical rod having a diameter of at least about 2 mm suitable for use in the manufacture of optical fibers which comprises:
   (a) an inner cylindrical glass core;
   (b) a substantially uniform layer of a direct gap semiconductor material surrounding said core; and
   (c) a substantially uniform layer of an outer glass cladding surrounding said semiconductor layer.

2. The preform of claim 1 in which the core and the outer cladding are made of a glass selected from the group consisting of Pyrex, pure fused silica, and aluminosilicate glasses.

3. The preform of claim 1 in which the index of refraction of the core is slightly higher than the index of refraction of the cladding.

4. The preform of claim 1 in which the semiconductor is at least one material selected from the group consisting of CdS, CdTe, CdSSe, GaAs, InGaAs, InAlGaAs, PbS, PbCdS, PbSiS, and HgCdTe.

5. A glass fiber suitable for use in a light amplifier or laser application which comprises;
   (a) an inner cylindrical glass core;
   (b) a substantially uniform layer of a direct gap semiconductor material surrounding said core; and
   (c) a substantially uniform layer of an outer glass cladding surrounding said semiconductor layer.

6. The fiber of claim 5 in which the core and the outer cladding are made of a glass selected from the group consisting of Pyrex, pure fused silica and aluminosilicate glasses.

7. The fiber of claim 5 in which the index of refraction of the core is slightly higher than the index of refraction of the cladding.

8. The fiber of claim 5 in which the semiconductor is at least one material selected from the group consisting of CdS, CdTe, CdSSe, GaAs, GaSb, InP, InAs, InSb, InGaAs, InAlGaAs, PbS, PbCdS, PbSiS, HgCdTe, InGaAsP, AlInP, AlGaAs, AlInAs, AlGaSb, AlInSb, GaInP, GaInSb, GaAsP, GaAssb, InPAs and InAsSb.

9. A composite preform in the form of a cylindrical rod having a diameter of at least about 2 mm suitable for use in the manufacture of optical fibers which comprises:
   (a) an inner cylindrical glass core;
   (b) a plurality of substantially uniform layers of a direct gap semiconductor material surrounding said core; and
   (c) a substantially uniform layer of an outer glass cladding surrounding said semiconductor layers.

10. The preform of claim 9 in which there are three layers of semiconductor material.

11. The preform of claim 9 in which the semiconductor is at least one material selected from the group consisting of CdS, CdTe, CdSSe, GaAs, GaSb, InP, InAs, InSb, InGaAs, InAlGaAs, PbS, PbCdS, PbSiS, HgCdTe, InGaAsP, AlInP, AlGaAs, AlInAs, AlGaSb, AlInSb, GaInP, GaInSb, GaAsP, GaAssb, InPAs, and InAsSb.

12. A glass fiber suitable for use in a light amplifier or laser application which comprises;
   (a) an inner cylindrical glass core;
   (b) a plurality of substantially uniform layers of a direct gap semiconductor material surrounding said core; and
   (c) a substantially uniform layer of an outer glass cladding surrounding said semiconductor layers.

13. The fiber of claim 12 in which there are three layers of semiconductor material.

14. A composite preform in the form of a cylindrical rod suitable for use in the manufacture of optical fibers which comprises:
   (a) an inner cylindrical glass core;
   (b) at least one contiguous substantially uniform layer of a direct gap semiconductor material in direct contact with said core; and
   (c) a substantially uniform layer of an outer glass cladding surrounding said core and semiconductor.

15. The preform of claim 14 in which the core and the outer cladding are made of a glass selected from the group consisting of Pyrex, pure fused silica, and aluminosilicate glasses.

16. The preform of claim 14 in which the core and the outer cladding are made of a glass selected from the group consisting of Pyrex, pure fused silica, and aluminosilicate glasses.

17. The preform of claim 14 in which the semiconductor is at least one material selected from the group consisting of CdS, CdTe, CdSSe, GaAs, InGaAs, InAlGaAs, PbS, PbCdS, PbSiS, and HgCdTe.

18. A composite preform in the form of a cylindrical rod having a diameter of at least about 2 mm suitable for use in the manufacture of optical fibers which comprises:
   (a) an inner cylindrical glass core;
   (b) at least one uniform layer of a direct gap semiconductor material surrounding said core;
   (c) an outer glass core surrounding said semiconductor layer; and
   (d) a substantially uniform layer of an outer glass cladding surrounding said outer core.

19. The preform of claim 18 in which there are three layers of semiconductor material.

20. The preform of claim 18 in which the semiconductor is at least one material selected from the group consisting of CdS, CdTe, CdSSe, GaAs, GaSb, InP, InAs, InSb, InGaAs, InAlGaAs, PbS, PbCdS, PbSiS, HgCdTe, InGaAsP, AlInP, AlGaAs, AlInAs, AlGaSb, AlInSb, GaInP, GaInSb, GaAsP, GaAssb, InPAs, and InAsSb.

* * * * *

UNITED STATES PATENT AND TRADEMARK OFFICE
CERTIFICATE OF CORRECTION

PATENT NO. : 5,838,868
DATED : November 17, 1998
INVENTOR(S) : Mark F. Krol, et al.

It is certified that error appears in the above-identified patent and that said Letters Patent is hereby corrected as shown below:

Column 1, line 5, please insert paragraph

-- This invention was made with government support under Grant No. F30602-93-C-0019 from the United States Air Force, Rome Laboratories. The government has certain rights in this invention. --

Signed and Sealed this

Thirtieth Day of March, 1999

Attest:

Q. TODD DICKINSON

Attesting Officer

Acting Commissioner of Patents and Trademarks